US012619044B1

(12) United States Patent
Hill et al.

(10) Patent No.: US 12,619,044 B1
(45) Date of Patent: May 5, 2026

(54) OPTICAL FIBER ROUTING TOOL

(71) Applicant: Clearfield, Inc., Minneapolis, MN (US)

(72) Inventors: John P. Hill, Oak Grove, MN (US);
William J. Cruzen, Monticello, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 19/063,610

(22) Filed: Feb. 26, 2025

Related U.S. Application Data

(63) Continuation-in-part of application No. 18/982,135, filed on Dec. 16, 2024.

(51) Int. Cl.
G02B 6/46 (2006.01)
B25J 1/00 (2006.01)
G02B 6/54 (2006.01)

(52) U.S. Cl.
CPC . *G02B 6/54* (2013.01); *B25J 1/00* (2013.01)

(58) Field of Classification Search
CPC .................................... G02B 6/54; B25J 1/00
See application file for complete search history.

(56) References Cited

U.S. PATENT DOCUMENTS

| | | | | |
|---|---|---|---|---|
| 10,746,951 | B2 * | 8/2020 | Bradley | G02B 6/475 |
| 2012/0020635 | A1 * | 1/2012 | Hendrickson | B65H 57/06 |
| | | | | 156/538 |
| 2012/0138214 | A1 * | 6/2012 | Burek | G02B 6/44528 |
| | | | | 156/166 |
| 2013/0020015 | A1 * | 1/2013 | Dickinson | B65H 57/06 |
| | | | | 156/166 |
| 2013/0333822 | A1 * | 12/2013 | Dickinson | B65H 57/26 |
| | | | | 156/166 |
| 2017/0357073 | A1 * | 12/2017 | Burek | G02B 6/3897 |
| 2018/0348165 | A1 * | 12/2018 | Nakamura | G02B 21/0092 |
| 2020/0093637 | A1 * | 3/2020 | Thyzel | A61F 9/00781 |
| 2020/0158979 | A1 * | 5/2020 | Bradley | G02B 6/47 |
| 2022/0082763 | A1 * | 3/2022 | Verheyden | G02B 6/3885 |

OTHER PUBLICATIONS

JP 2024024472A—Aqueous Ink Composition for Writing Instrument and Writing Instrument, 31 pages. (Year: 2025).*
CN 115373093A—A fibre distributing device, 26 pages. (Year: 2025).*

* cited by examiner

*Primary Examiner* — Tuyen K Vo
(74) *Attorney, Agent, or Firm* — TROUTMAN PEPPER LOCKE LLP; Alison L. McCarthy; Mark Lehi Jones

(57) ABSTRACT

An optical fiber routing tool that can protect optical fiber and facilitate routing of the optical fiber during installation. The optical fiber routing tool includes a pen-shaped elongated body that includes a body bore therethrough configured to receive one or more optical fiber. The tool can further include a removable tip for single fiber routing, the removable tip comprises a tip bore having a reduced diameter tip bore therethrough and configured to receive an optical fiber. Additionally, the tool can include other optional features, such as a tapered tip, an attachment feature such as clip for storing the removable tip when not in use, and/or pick features, for added functionality.

18 Claims, 15 Drawing Sheets

Front and back collar opened

Front collar closed

Front and back collar closed

Front collar opened

600

602

110

102
(502)

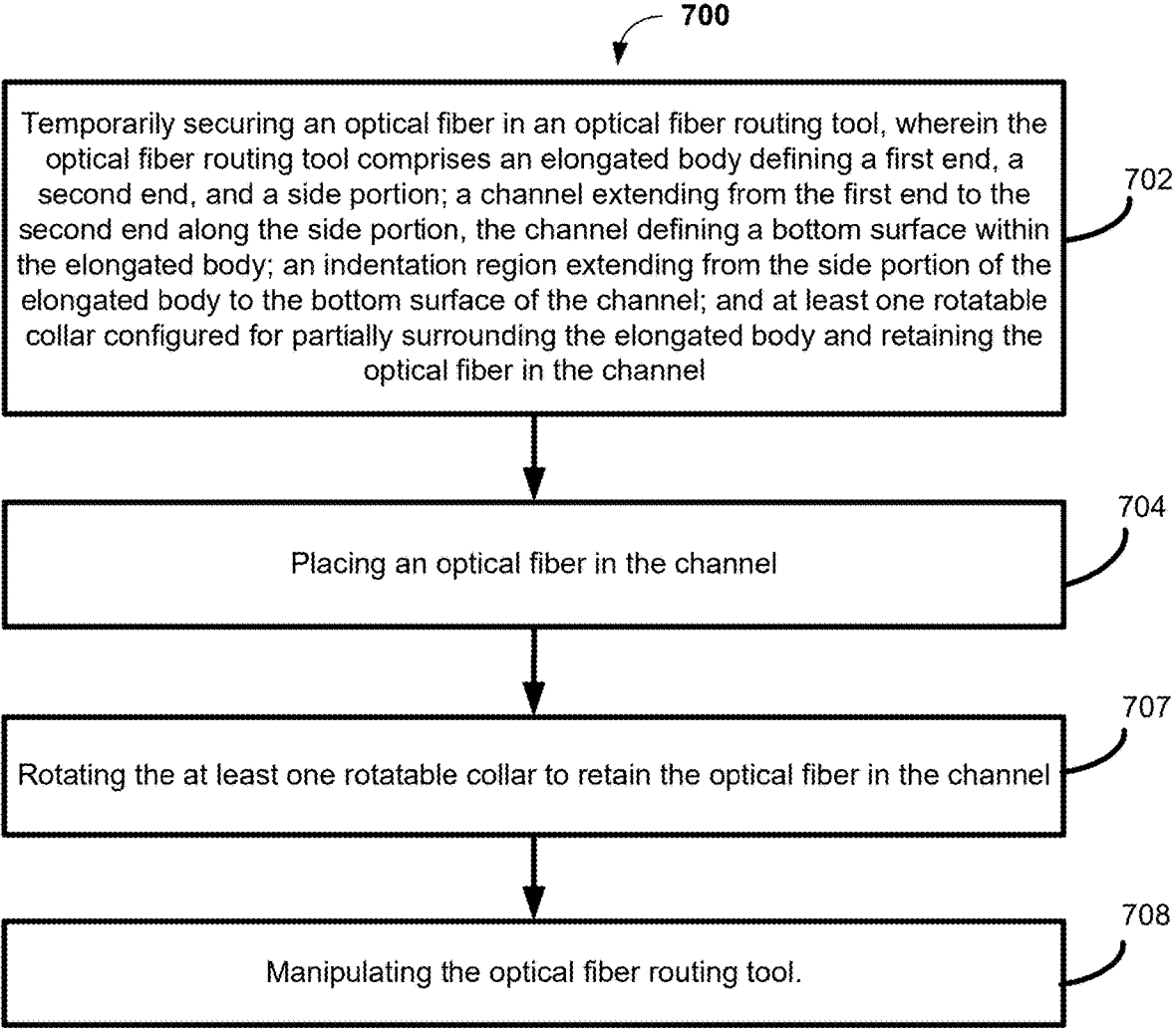

700

Temporarily securing an optical fiber in an optical fiber routing tool, wherein the optical fiber routing tool comprises an elongated body defining a first end, a second end, and a side portion; a channel extending from the first end to the second end along the side portion, the channel defining a bottom surface within the elongated body; an indentation region extending from the side portion of the elongated body to the bottom surface of the channel; and at least one rotatable collar configured for partially surrounding the elongated body and retaining the optical fiber in the channel

702

Placing an optical fiber in the channel

704

Rotating the at least one rotatable collar to retain the optical fiber in the channel

707

Manipulating the optical fiber routing tool.

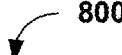

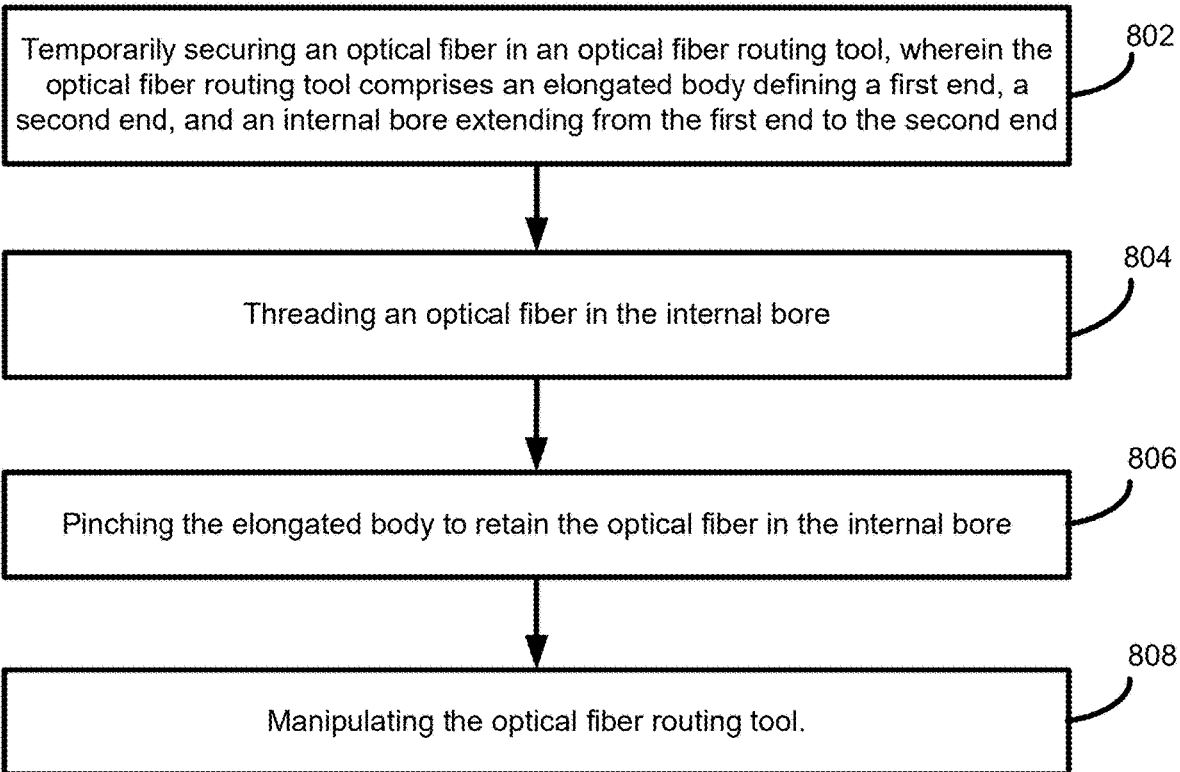

Temporarily securing an optical fiber in an optical fiber routing tool, wherein the optical fiber routing tool comprises an elongated body defining a first end, a second end, and an internal bore extending from the first end to the second end — 802

Threading an optical fiber in the internal bore — 804

Pinching the elongated body to retain the optical fiber in the internal bore — 806

Manipulating the optical fiber routing tool. — 808

FIG. 8

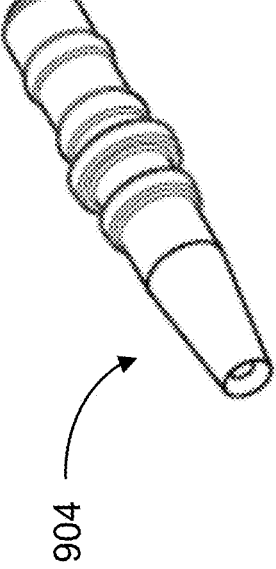
904
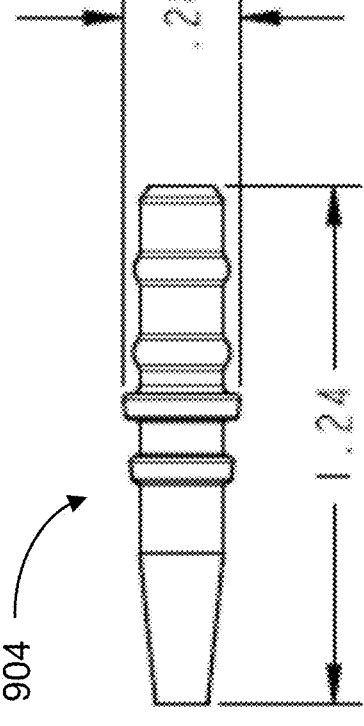
904
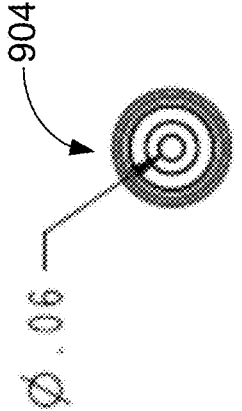
904
FIG. 13

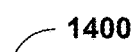
1400

Temporarily securing the plurality of optical fibers in the optical fiber routing tool, wherein the optical fiber routing tool comprises an elongated body comprising a body bore having a first diameter and extending from a first end of the elongated body to a second end of the elongated body, the body bore configured for placing one or more optical fibers therethrough, and a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing an optical fiber therethrough

1402

Removing the removable tip from the body bore of the optical fiber routing tool

1404

Threading the plurality of optical fibers through the body bore

1406

Manipulating the optical fiber routing tool.

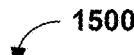

1500

Temporarily securing the optical fiber in the optical fiber routing tool, wherein the optical fiber routing tool comprises an elongated body comprising a body bore having a first diameter and extending from a first end of the elongated body to a second end of the elongated body, the body bore configured for placing one or more fibers therethrough, and a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing a fiber therethrough

1502

Inserting the second end of the removable tip into the body bore of the elongated body at the first end

1504

Threading the optical fiber through the combined tip bore of the removable tip and the body bore of the elongated body

1506

Manipulating the optical fiber routing tool.

OPTICAL FIBER ROUTING TOOL

CROSS REFERENCE TO RELATED APPLICATIONS

This application is a Continuation-in-Part of U.S. patent application Ser. No. 18/982,135 filed 16 Dec. 2024, the contents of which are incorporated herein by reference as if presented in full.

FIELD OF THE INVENTION

The disclosed technology generally relates to tools for handling optical fibers and, more particularly, to a tool designed to manipulate and position optical fibers within an enclosure or related environment.

BACKGROUND

The installation and management of optical fibers often require precise handling to avoid damage to the fibers, which are fragile and sensitive to excessive bending and stress. Even though optical fiber permits higher levels of transmission in the same or smaller footprint compared to traditional copper transmission equipment, demand continues to push for even higher levels of optical fiber density. This has led to the development of high-density fiber handling equipment, such as optical fiber cassettes, modules, rack housings, and related telecommunication enclosures. These enclosures typically include ports, radius limiters, slack fiber storage regions, splice trays, and other optical fiber retaining features, etc., that can help protect and secure optical fiber once it is installed.

The routing and placement of optical fibers in telecommunication enclosures typically requires careful manual manipulation to avoid damaging the fiber and minimizing bend losses. Keeping track of an individual fiber and routing it among the other fibers in a high-density enclosure can be very difficult due to the very small diameter of the optical fibers.

A need exists for tools that can aid in controlled manipulation and routing of optical fibers.

BRIEF SUMMARY

Embodiments of the disclosed technology include an optical fiber routing tool having retaining features that can protect an optical fiber and facilitate routing of the optical fiber during installation. The optical fiber routing tool includes a pen-shaped elongated body that includes a channel configured to receive an optical fiber. In certain implementations, the tool may further comprise a rotatable collar mechanism that can secure the fiber in the channel, preventing movement during handling. Certain implementations of the tool can include a unique indentation region designed to enable a user to apply finger pressure to secure the fiber in place. The tool may include other optional features, such as a tapered tip and a pick features, for added functionality.

In accordance with certain exemplary implementations of the disclosed technology, the optical fiber routing tool can be characterized as having an elongated body, which can define a first end, a second end, and a side portion. The optical fiber routing tool can include a channel extending from the first end to the second end along the side portion and configured for placing an optical fiber therein. The channel defines a bottom surface within the elongated body. In certain implementations, an indentation region may extend from the side portion of the elongated body to the bottom surface of the channel and may be configured for securing the optical fiber against the bottom surface by finger pressure. The optical fiber routing tool can include one or more rotatable collars configured for partially surrounding the elongated body and retaining the optical fiber in the channel.

In another aspect of the disclosed technology, a method is provided for routing an optical fiber in an enclosure using an optical fiber routing tool. The method can include temporarily securing the optical fiber in the optical fiber routing tool. The optical fiber routing tool includes an elongated body defining a first end, a second end, and a side portion. The optical fiber routing tool includes a channel extending from the first end to the second end along the side portion, the channel defining a bottom surface within the elongated body, an indentation region extending from the side portion of the elongated body to the bottom surface of the channel, and at least one rotatable collar configured for partially surrounding the elongated body and retaining the optical fiber in the channel. Temporarily securing the optical fiber in the optical fiber routing tool can include placing an optical fiber in the channel, rotating the at least one rotatable collar to retain the optical fiber in the channel, securing the optical fiber against the bottom surface by finger pressure, and manipulating the optical fiber routing tool.

In accordance with certain exemplary implementations of the disclosed technology, the optical fiber routing tool can be characterized as having an elongated body, which can define a first end, a second end. The optical fiber routing tool can include a central bore extending from the first end to the second and configured for threading an optical fiber therein. The optical fiber routing tool may be utilized to manipulate and/or route the optical fiber.

In another aspect of the disclosed technology, a method is provided for routing an optical fiber in an enclosure using an optical fiber routing tool. The method can include temporarily securing the optical fiber in the optical fiber routing tool. The optical fiber routing tool includes an elongated body defining a first end, a second end, and an internal bore extending from the first end to the second end. The method can include threading an optical fiber in the internal bore and manipulating the optical fiber routing tool.

In accordance with certain exemplary implementations of the disclosed technology, another optical fiber routing tool is provided. The optical fiber routing tool can include an elongated body having a body bore therethrough and characterized by a first diameter and extending from a first end of the elongated body to a second end of the elongated body, the body bore is configured for placing one or more optical fibers therethrough for routing. The optical fiber routing tool can include a selectively removable tip comprising a tip bore therethrough and characterized by a second diameter smaller than the first diameter of the body bore and extending from a first end of the removable tip to a second end of the removable tip. The second end of the removable tip is configured to couple with the body bore at the first end of the elongated body, and the tip bore of the removable tip is configured for placing an optical fiber therethrough for routing.

In another aspect of the disclosed technology, a method is provided for routing a plurality of optical fibers in an enclosure using an optical fiber routing tool. The method can include temporarily securing the plurality of optical fibers in the optical fiber routing tool, wherein the optical fiber routing tool comprises an elongated body comprising a body bore therethrough, the body bore having a first diameter and extending from a first end of the elongated body to a second end of the elongated body, the body bore configured for placing one or more optical fibers therethrough, and a selectively removable tip comprising a tip bore therethrough, the tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing an optical fiber therethrough, wherein temporarily securing the plurality of fibers in the optical fiber routing tool comprises removing the removable tip from the body bore of the optical fiber routing tool, threading the plurality of optical fibers through the body bore, and manipulating the optical fiber routing tool.

In another aspect of the disclosed technology, a method is provided for routing an optical fiber in an enclosure using an optical fiber routing tool. The method can include temporarily securing the optical fiber in the optical fiber routing tool, wherein the optical fiber routing tool includes an elongated body comprising a body bore having a first diameter and extending from a first end of the elongated body to a second end of the elongated body, the body bore configured for placing one or more fibers therethrough, and a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing a fiber therethrough. Temporarily securing the optical fiber in the optical fiber routing tool can include inserting the second end of the removable tip into the body bore of the elongated body at the first end, threading the optical fiber through the combined tip bore of the removable tip and the body bore of the elongated body, and manipulating the optical fiber routing tool.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale.

FIG. 7 is a flow diagram of a method 700 in accordance with certain exemplary implementations of the disclosed technology.

FIG. 8 is a flow diagram of a method 800 in accordance with certain exemplary implementations of the disclosed technology.

FIG. 13 illustrates a perspective view (top figure), a cross-sectional side view (bottom right figure) and a cross-sectional end view (bottom left figure) with example dimensions of the single fiber tip attachment portion of the optical fiber routing tool (without the elongated body) in accordance with certain exemplary implementations of the disclosed technology.

FIG. 14 is a flow diagram of a method 1400 in accordance with certain exemplary implementations of the disclosed technology.

FIG. 15 is a flow diagram of a method 1500 in accordance with certain exemplary implementations of the disclosed technology.

Figure 1:
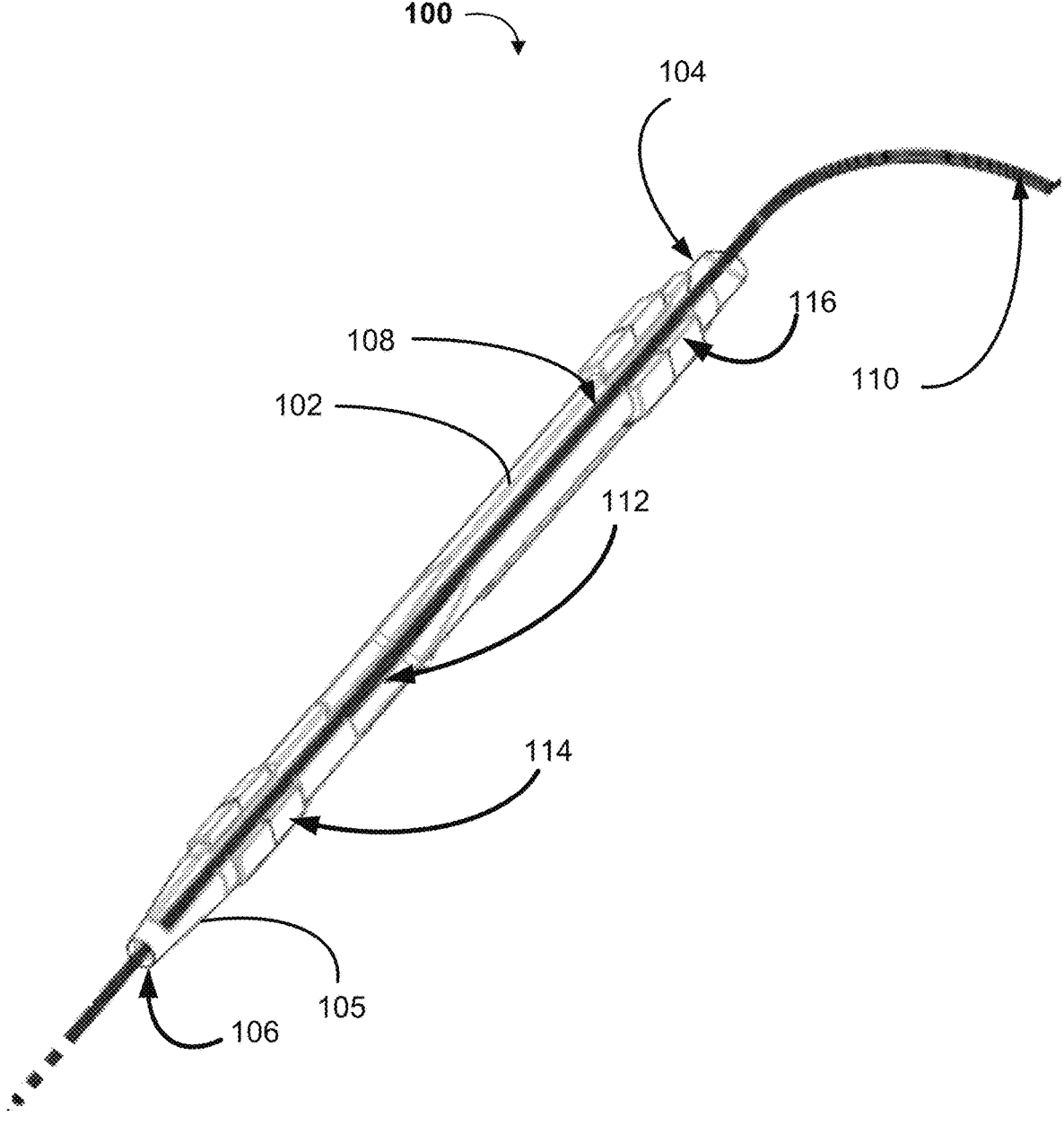
FIG. 1 illustrates a perspective view of an optical fiber routing tool system 100 with an optical fiber 110 placed in the tool's 102 channel 108, in accordance with certain implementations of the disclosed technology.

Various features of the technology described herein will become more apparent to those skilled in the art from a study of the Detailed Description in conjunction with the drawings. Those skilled in the art will recognize that alternative embodiments may be employed without departing from the principles of the technology. Accordingly, although specific embodiments are shown in the drawings, the technology is amenable to various modifications.

DETAILED DESCRIPTION

The disclosed technology includes an optical fiber routing tool that may be utilized to secure, manipulate, and/or position optical fibers within an enclosure or related environment while protecting the optical fiber from excess bending or breakage.

The terminology used herein is for the purpose of describing particular implementations and is not intended to be limiting. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Like numbers refer to like elements throughout. In the figures, the thickness of certain lines, layers, components, elements or features may be exaggerated for clarity.

It will be understood that when an element is referred to as being "on", "attached" to, "connected" to, "coupled" with, "contacting", "joined," with etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

The disclosed technology is described more fully hereinafter with reference to the accompanying drawings, in which certain example implementations are shown. The disclosed technology may, however, be embodied in many different forms and should not be construed as limited to the embodiments or examples set forth herein; rather, these embodiments or examples are provided so that this disclosure will be thorough and complete, and will fully convey the scope of the invention to those skilled in the art.

FIG. 1 illustrates a perspective view of an optical fiber routing tool system 100 with an optical fiber 110 placed in the tool's 102 channel 108, in accordance with certain implementations of the disclosed technology. In certain implementations, the channel 108 may extend through the length of the tool 102, with an elongated side of the channel 108 opening to facilitate placing the optical fiber 110 in the channel 108. A middle section of the tool 102 can include an indented region 112 that facilitates holding an optical fiber in place by finger or thumb pressure while manipulating and routing the fiber 110. Certain implementations of the tool 102 can include one or more rotatable collars 114, 116, each having a gap that can be aligned with the channel 108 for insertion of the optical fiber 110 in the channel 108, then rotated to retain the optical fiber 110 within the channel 108 to further aid in the retention of the optical fiber 110 in the tool 102 while routing the optical fiber 110. In certain implementations, the tool 102 can include a tapered tip 105 with a central bore 106 aligned with the channel 108 that can aid in threading the optical fiber 110 into the tool 102 and may provide additional support and retention at the tip 105. In certain implementations, the bore 106 may align with the channel 108, enabling the fiber to pass through the tip 105. This configuration not only aids in threading the fiber into the channel 108, but also provides additional support and retention at the tip 105. In certain implementations, an end portion of the tool 102 may include a pick feature 104 that may be utilized, for example, to select and manipulate an optical fiber and/or related components. This pick feature 104 may be particularly useful in enclosures with limited space, allowing fine adjustments or positioning of the fiber.

Figures 2A, 2B, 2C:
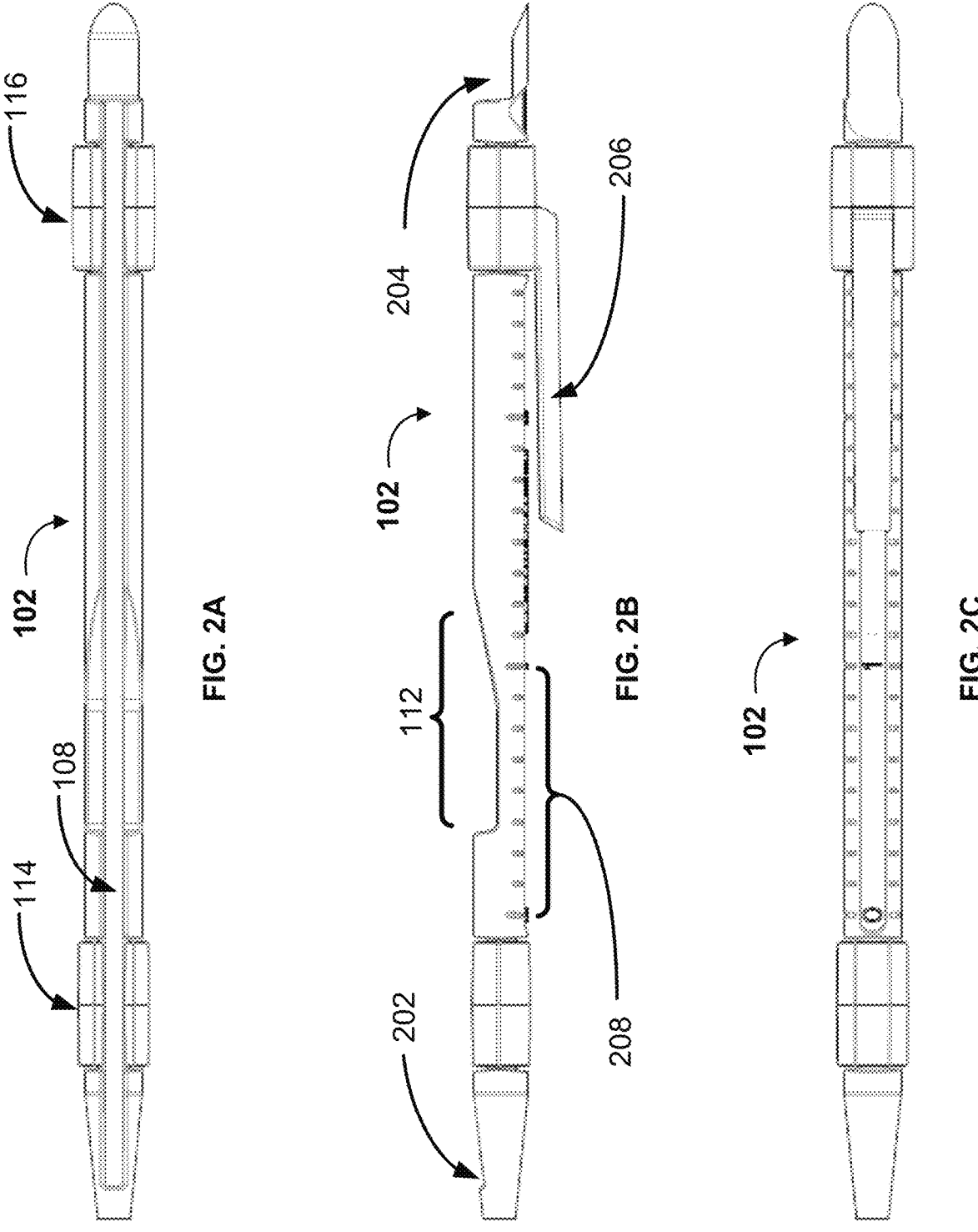
FIG. 2A illustrates a top-side view of the optical fiber routing tool 102 with a top-down view of the channel 108, in accordance with certain exemplary implementations of the disclosed technology.
FIG. 2B illustrates a side view of the optical fiber routing tool 102 illustrating a profile of the indentation 112 and tip hook 202 and end pick 204, in accordance with certain exemplary implementations of the disclosed technology.
FIG. 2C illustrates a back-side view of the optical fiber routing tool 102, in accordance with certain exemplary implementations of the disclosed technology.

FIG. 2A illustrates a top-side view of the optical fiber routing tool 102 with a top-down view of the channel 108, in accordance with certain exemplary implementations of the disclosed technology. The tool 102 may be characterized as having an elongated body having a first end and a second end. This elongated body is preferably cylindrical or pen-shaped, though other shapes may also be used. The cylindrical structure provides a central axis extending from the first end to the second end along which a channel 108 may be defined. As discussed above, the tool 102 can include one or more rotatable collars 114, 116, each having a gap that can be aligned with the channel 108 for insertion of an optical fiber in the channel 108, then rotated to retain the optical fiber within the channel 108 to further aid in the retention of the optical fiber in the tool 102 while routing the optical fiber.

The channel 108 may extend from the first end to the second end along the side portion of the tool 102. This channel 108 may be designed to receive and guide an optical fiber. A bottom surface of the channel 108 may align with the central axis of the elongated body, allowing the fiber to sit securely within the tool 102.

FIG. 2B illustrates a side view of the optical fiber routing tool 102, which illustrates a profile of the indentation 112, a tip hook 202, and an end pick 204, in accordance with certain exemplary implementations of the disclosed technology. The indentation 112 may include a region that corresponds to the bottom surface of the channel 108 and may aid in reducing unwanted fiber displacement during manipulation. In certain implementations, the indentation region may extend from a side portion of the elongated body down to the bottom surface of the channel 108. This indentation may be designed to secure the optical fiber against the bottom surface by finger pressure in the channel 112, for example to hold the fiber against the bottom surface of the channel 112. The indentation may include a step edge toward the first end and a tapered portion toward the second end, which may assist in comfortably positioning the fiber and preventing unintentional dislodgement during use.

In certain implementations, a measuring indicator 208 may be included on the body of the optical fiber routing tool 102. In certain implementations, a clip 206 may be included, for example, to secure the tool 102 in a pocket, much like a pen. In certain implementations, the clip 206 can be attached to the rotatable collar 116.

FIG. 2C illustrates a back-side view of the optical fiber routing tool 102, in accordance with certain exemplary implementations of the disclosed technology.

Figure 3A:
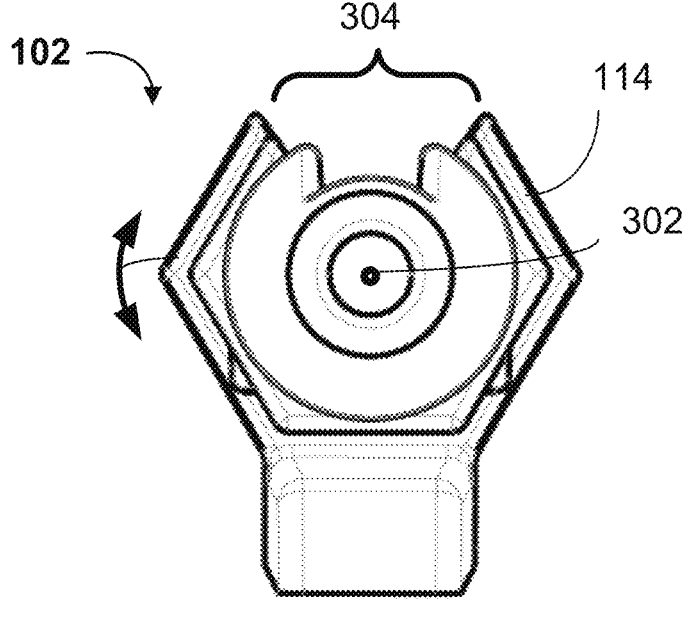
FIG. 3A illustrates a tip-end view of the optical fiber routing tool 102 having an axis 302, and a front rotatable collar 114 having a gap 304 in accordance with certain exemplary implementations of the disclosed technology.

FIG. 3A illustrates a tip-end view of the optical fiber routing tool 102 having an axis 302, and a front rotatable collar 114 having a gap 304 in accordance with certain exemplary implementations of the disclosed technology. In certain implementations, the front rotatable collar 114 may be arranged on the elongated body and may partially surround the body to retain the fiber within the channel 108. The front rotatable collar 114 may feature a gap 304 that may align with the channel 108 upon rotation, allowing the optical fiber to be inserted or removed as needed. When the gap 304 is not aligned with the channel 108, the collar 114 may prevent the fiber from escaping, thereby securing it in place.

Figure 3B:
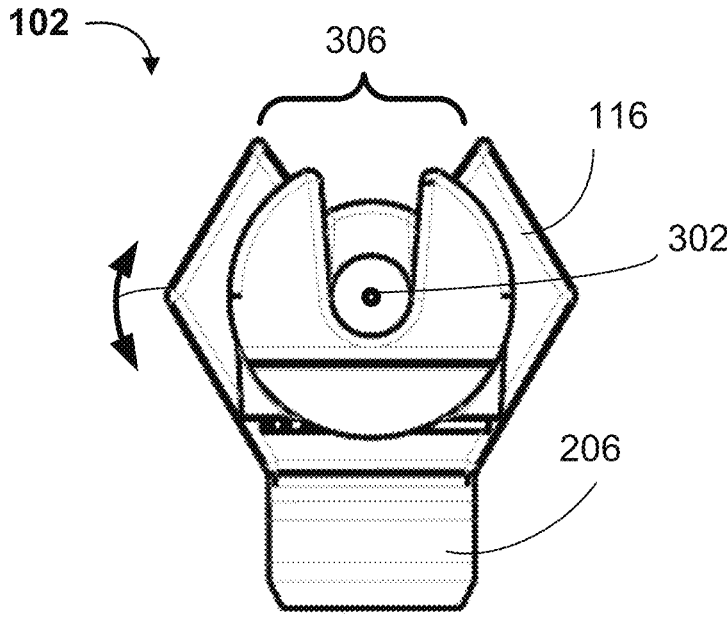
FIG. 3B illustrates a back-end view of the optical fiber routing tool 102 having an axis 302, and a back rotatable collar 116 having a gap 306 in accordance with certain exemplary implementations of the disclosed technology.

FIG. 3B illustrates a back-end view of the optical fiber routing tool 102 having an axis 302, and a back rotatable collar 116 having a gap 306 in accordance with certain exemplary implementations of the disclosed technology. In certain implementations, the back rotatable collar 116 may be positioned adjacent to the second end. Like the front rotatable collar 114, the back rotatable collar 116 may assist in securing the fiber within the channel 108. In certain implementations, the back rotatable collar 116 may be attached to an attachment feature such as the clip 206.

Figures 4A, 4B, 4C, 4D:
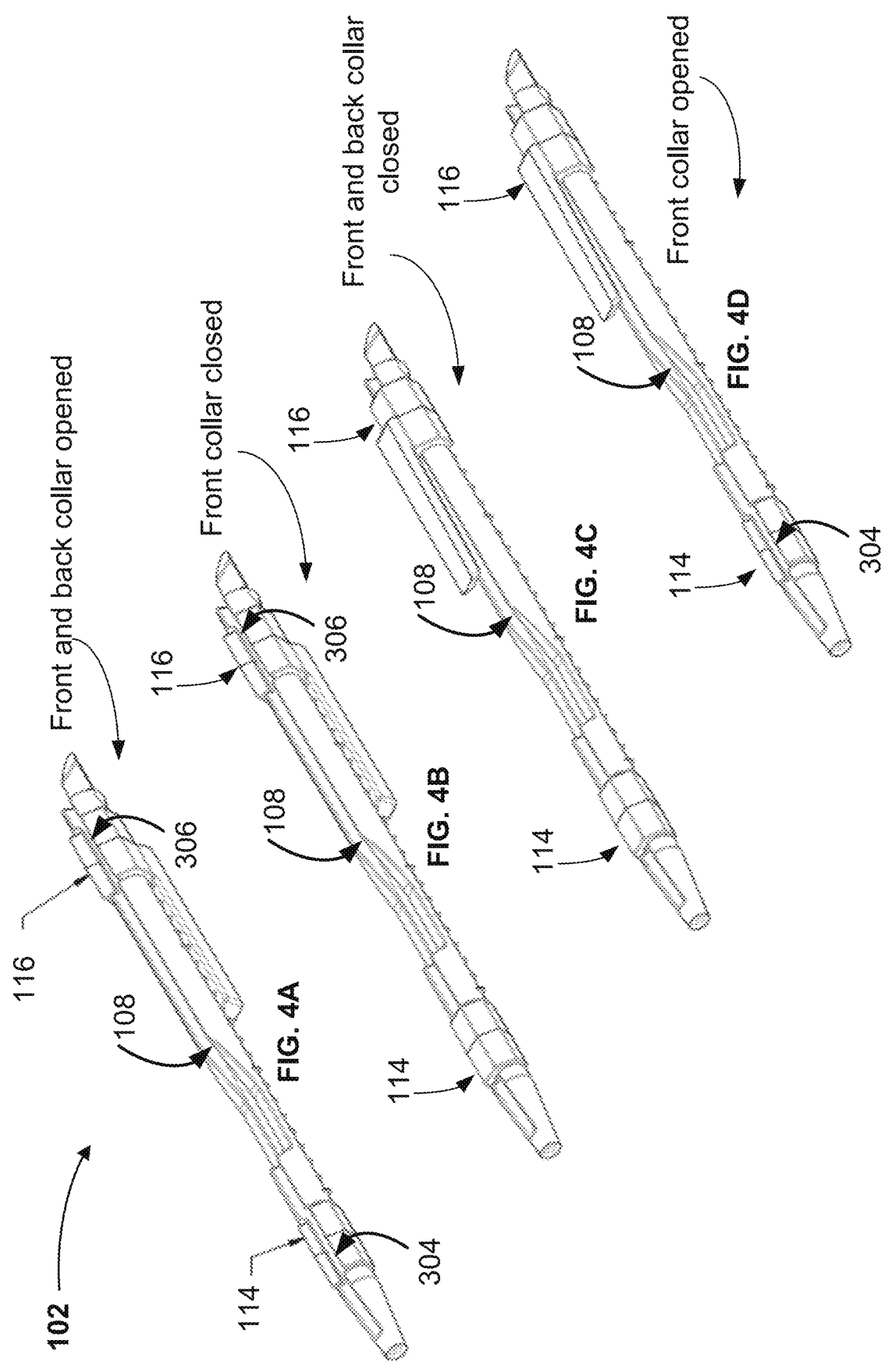
FIG. 4A illustrates a perspective view of an optical fiber routing tool 102 where the front rotatable collar 114 and the back rotatable collar 116 are rotated so that the respective gaps 304 306 are aligned with the channel 108 to facilitate side insertion of an optical fiber into the tool 102, in accordance with certain exemplary implementations of the disclosed technology.
FIG. 4B illustrates a perspective view of an optical fiber routing tool 102 where the front rotatable collar 114 is rotated to surround the channel 108 for retaining an optical fiber therein, while the back rotatable collar 116 rotated so that its gap 306 is aligned with the channel 108, in accordance with certain exemplary implementations of the disclosed technology.
FIG. 4C illustrates a perspective view of an optical fiber routing tool 102 where both the front rotatable collar 114 and the back rotatable collar are rotated to surround the channel 108 for retaining an optical fiber therein, in accordance with certain exemplary implementations of the disclosed technology.
FIG. 4D illustrates a perspective view of an optical fiber routing tool 102 where the back rotatable collar 116 is rotated to surround the channel 108 for retaining an optical fiber therein, while the front rotatable collar 114 rotated so that its gap 306 is aligned with the channel 108, in accordance with certain exemplary implementations of the disclosed technology.

FIG. 4A illustrates a perspective view of an optical fiber routing tool 102 where the front rotatable collar 114 and the back rotatable collar 116 are rotated so that the respective gaps 304 306 are aligned with the channel 108 to facilitate side insertion of an optical fiber into the tool 102, in accordance with certain exemplary implementations of the disclosed technology.

FIG. 4B illustrates a perspective view of an optical fiber routing tool 102 where the front rotatable collar 114 is rotated to surround the channel 108 for retaining an optical fiber therein, while the back rotatable collar 116 is rotated so that its gap 306 is aligned with the channel 108, in accordance with certain exemplary implementations of the disclosed technology.

FIG. 4C illustrates a perspective view of an optical fiber routing tool 102 where both the front rotatable collar 114 and the back rotatable collar are rotated to surround the channel 108 for retaining an optical fiber therein, in accordance with certain exemplary implementations of the disclosed technology.

FIG. 4D illustrates a perspective view of an optical fiber routing tool 102 where the back rotatable collar 116 is rotated to surround the channel 108 for retaining an optical fiber therein, while the front rotatable collar 114 is rotated so that its gap 306 is aligned with the channel 108, in accordance with certain exemplary implementations of the disclosed technology.

Figures 5A, 5B, 5C, 5D, 5E, 5F:
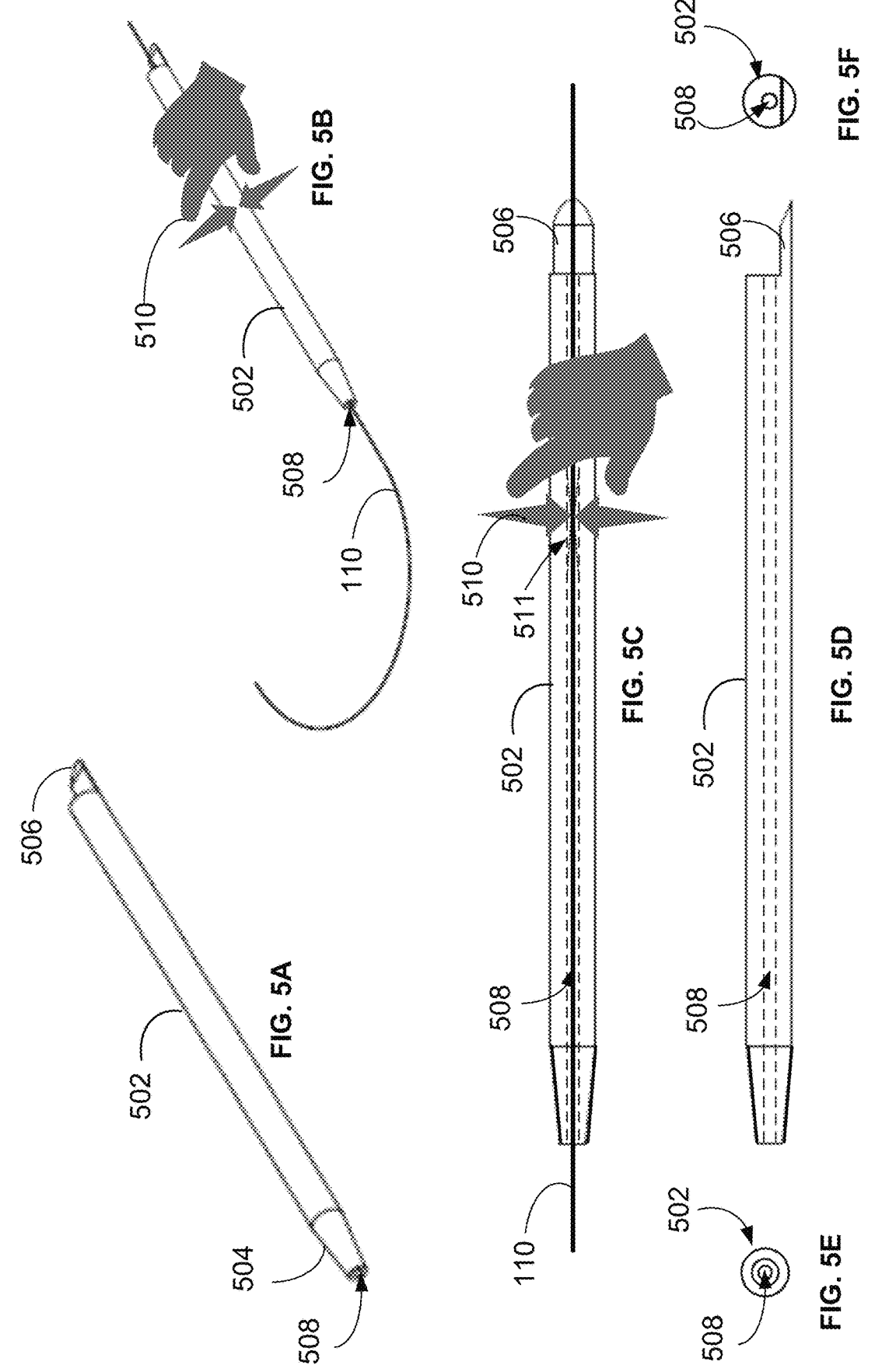
FIG. 5A illustrates a perspective view of an optical fiber routing tool 502 characterized by an elongated body defining a first end 504, a second end 506, and an internal bore 508 extending through the elongated body from the first end to the second end, in accordance with certain exemplary implementations of the disclosed technology.
FIG. 5B illustrates a perspective view of the optical fiber routing tool 502 with an optical fiber 110 threaded through the internal bore 508 of the optical fiber routing tool 502, in accordance with certain exemplary implementations of the disclosed technology.
FIG. 5C illustrates a top view of the optical fiber routing tool 502 and indicates the internal bore 508 (dashed lines) though the elongated body, in accordance with certain exemplary implementations of the disclosed technology.
FIG. 5D illustrates a side view of the optical fiber routing tool 502 and indicates the internal bore 508 (dashed lines) though the elongated body and a pick feature at the second end 506, in accordance with certain exemplary implementations of the disclosed technology.
FIG. 5E illustrates a first-end view of the optical fiber routing tool 502, in accordance with certain exemplary implementations of the disclosed technology.
FIG. 5F illustrates a second-end view of the optical fiber routing tool 502, in accordance with certain exemplary implementations of the disclosed technology.

FIG. 5A illustrates a perspective view of an optical fiber routing tool 502 characterized by an elongated body defining a first end 504, a second end 506, and an internal bore 508 extending through the elongated body from the first end to the second end, in accordance with certain exemplary implementations of the disclosed technology.

FIG. 5B illustrates a perspective view of the optical fiber routing tool 502 with an optical fiber 110 threaded through the internal bore 508 of the optical fiber routing tool 502, in accordance with certain exemplary implementations of the disclosed technology. In certain exemplary implementations, the elongated body may be flexible to allow pinching 510 of the body to temporarily clamp down on the optical fiber 110 while manipulating the optical fiber 110 so that it does not slide within the internal bore 508.

FIG. 5C illustrates a top view of the optical fiber routing tool 502 and indicates the internal bore 508 (dashed lines) though the elongated body, in accordance with certain exemplary implementations of the disclosed technology. In certain implementations, the elongated body of the optical fiber routing tool 502 may be pinched 510 to form a clamp region 511 within the internal bore 508 to prevent the optical fiber 110 from sliding within the internal bore 508 while manipulating the optical fiber 110.

FIG. 5D illustrates a side view of the optical fiber routing tool 502 and indicates the internal bore 508 (dashed lines) though the elongated body and a pick feature at the second end 506, in accordance with certain exemplary implementations of the disclosed technology.

FIG. 5E illustrates a first-end view of the optical fiber routing tool 502, in accordance with certain exemplary implementations of the disclosed technology.

FIG. 5F illustrates a second-end view of the optical fiber routing tool 502, in accordance with certain exemplary implementations of the disclosed technology.

Figure 6:
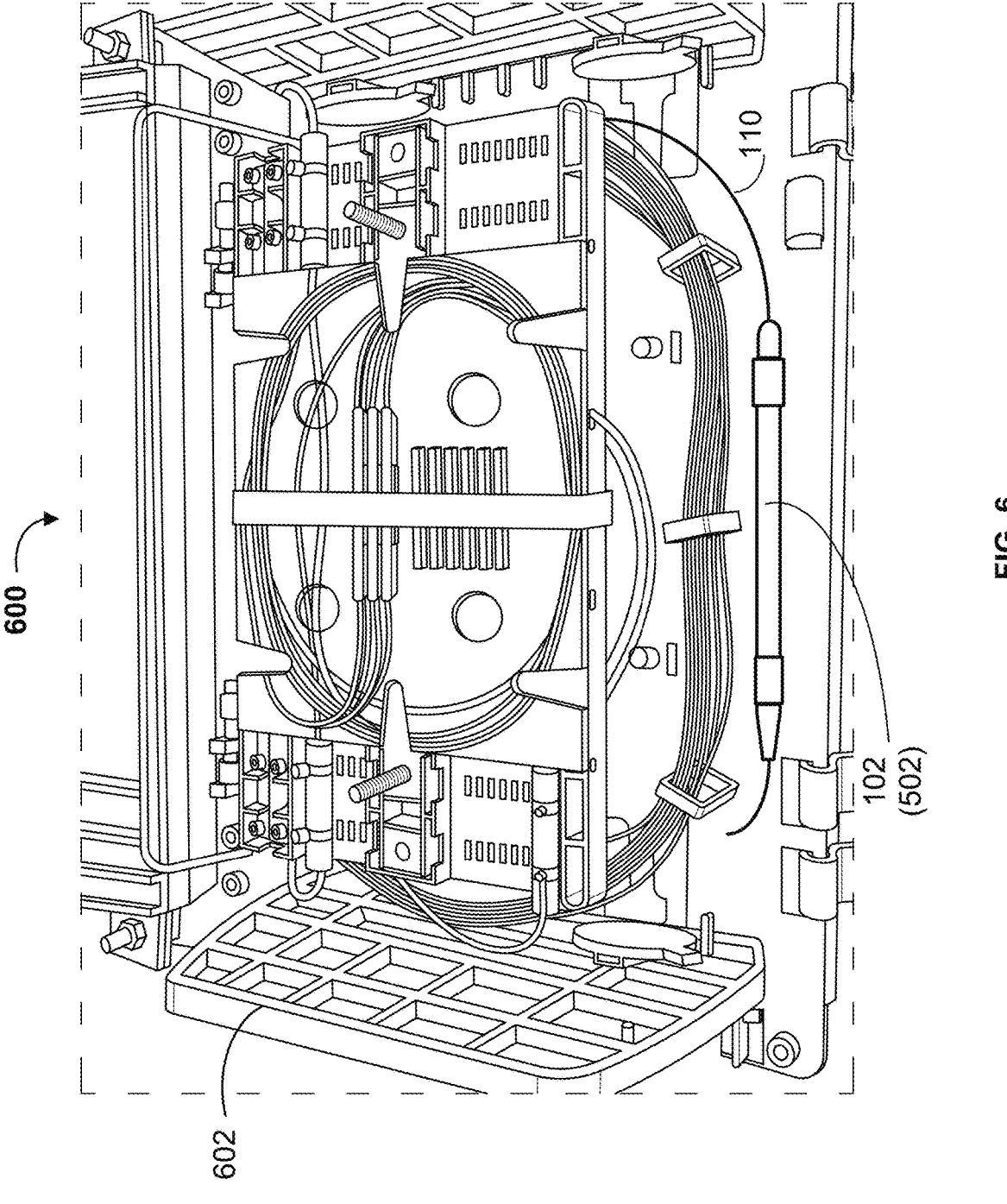
FIG. 6 illustrates installation 600 of an optical fiber 110 in an optical fiber housing module 602 using the optical fiber routing tool, in accordance with certain exemplary implementations of the disclosed technology.

FIG. 6 illustrates installation 600 of an optical fiber 110 in an optical fiber housing module 602 using the optical fiber routing tool (such as the fiber routing tool 102 illustrated in FIG. 1 though FIG. 4D, and/or the fiber routing tool 502 illustrated in FIG. 5A though FIG. 5F) in accordance with certain exemplary implementations of the disclosed technology. The optical fiber routing tool 102, 502 may enable a method for routing an optical fiber within an enclosure. For example, to use the tool 102, 502 the optical fiber 110 may be threaded into the tool 102, 502, and in the channel or internal bore.

In certain implementations, and in the case where the fiber routing tool 102 (as illustrated in FIG. 1 though FIG. 4D) is utilized, finger or thumb pressure may be applied over the indentation region 112 to secure the fiber against the bottom surface. Once positioned, the first and, optionally, second rotatable collars may be rotated such that their gaps are not aligned with the channel. This rotation secures the fiber in place and prevents lateral movement. Should the fiber need to be released, the collars can be rotated back to align the gap with the channel, allowing for easy removal. When the tool includes a tapered tip with a central bore, the method further can include threading a free end of the optical fiber through the bore, which may align the fiber for secure routing through the channel. With the fiber secured, the tool 102 can be used to manipulate the fiber within the enclosure or module 602. After manipulation, the fiber can be released by rotating the collar to realign the gap with the channel, allowing for easy fiber removal.

In certain implementations, and in the case where the fiber routing tool 502 (as illustrated in FIG. 5A though FIG. 5F) is utilized, pinching pressure may be applied to the elongated body to (temporarily) secure the fiber within the internal bore 508 while routing the optical fiber 110 in the optical fiber housing module 602. Should the fiber 110 need to be released, the pinch pressure 510 may be removed, allowing for easy removal of the optical fiber 110. With the fiber 110 secured, the tool 502 can be used to manipulate the fiber within the enclosure or module 602.

FIG. 7 is a flow diagram of a method 700 in accordance with certain exemplary implementations of the disclosed technology. In block 702, the method 700 includes temporarily securing an optical fiber in an optical fiber routing tool, wherein the optical fiber routing tool comprises an elongated body defining a first end, a second end, and a side portion; a channel extending from the first end to the second end along the side portion, the channel defining a bottom surface within the elongated body; an indentation region extending from the side portion of the elongated body to the bottom surface of the channel; and at least one rotatable collar configured for partially surrounding the elongated body and retaining the optical fiber in the channel. In block 704, the method 700 includes placing an optical fiber in the channel. In block 707, the method 700 includes rotating the at least one rotatable collar to retain the optical fiber in the channel. In block 708, the method 600 includes manipulating the optical fiber routing tool.

In certain implementations, the at least one rotatable collar can include a gap configured to allow the optical fiber to pass into the channel along the side portion when the at least one rotatable collar is rotated about the elongated body to align the gap with the channel. In certain implementations, the at least one rotatable collar is configured to retain the optical fiber in the channel when the at least one rotatable collar is axially rotated about the elongated body such that the gap does not align with the channel.

Certain implementations of the disclosed technology can include securing the optical fiber against the bottom surface by finger pressure.

In accordance with certain exemplary implementations of the disclosed technology, the optical fiber routing tool further can include a tapered tip disposed at the first end. In some implementations, the tapered tip can include a central bore at least partially co-aligned with the channel, and temporarily securing the optical fiber in the optical fiber routing tool can include threading a free end of the optical fiber through the central bore.

In certain implementations, the optical fiber routing tool further may include a pick feature disposed at the second end and configured to facilitate manipulation of optical components or fibers.

In certain implementations, the indentation region can include a step edge towards the first end, and a tapered portion towards the second end.

Certain implementations of the disclosed technology can include removing the optical fiber from the optical fiber routing tool upon completion of the manipulation and routing of the optical fiber. In certain implementations, removing the optical fiber from the routing tool can include rotating the at least one rotatable collar about the elongated body to align the gap with the channel.

In certain implementations, the elongated body of the tool 102 may essentially be cylindrical in shape.

In certain implementations, the bottom surface of the channel 108 may be aligned with a central axis 302 of the elongated body extending from the first end to the second end.

FIG. 8 is a flow diagram of a method 800 in accordance with certain exemplary implementations of the disclosed technology. In block 802, the method 800 includes temporarily securing an optical fiber in an optical fiber routing tool, wherein the optical fiber routing tool comprises an elongated body defining a first end, a second end, and an internal bore extending from the first end to the second end. In block 804, the method 800 includes threading an optical fiber in the internal bore. In block 806, the method 800 includes pinching the elongated body to retain the optical fiber in the internal bore. In block 808, the method 600 includes manipulating the optical fiber routing tool.

Figures 9A, 9B:
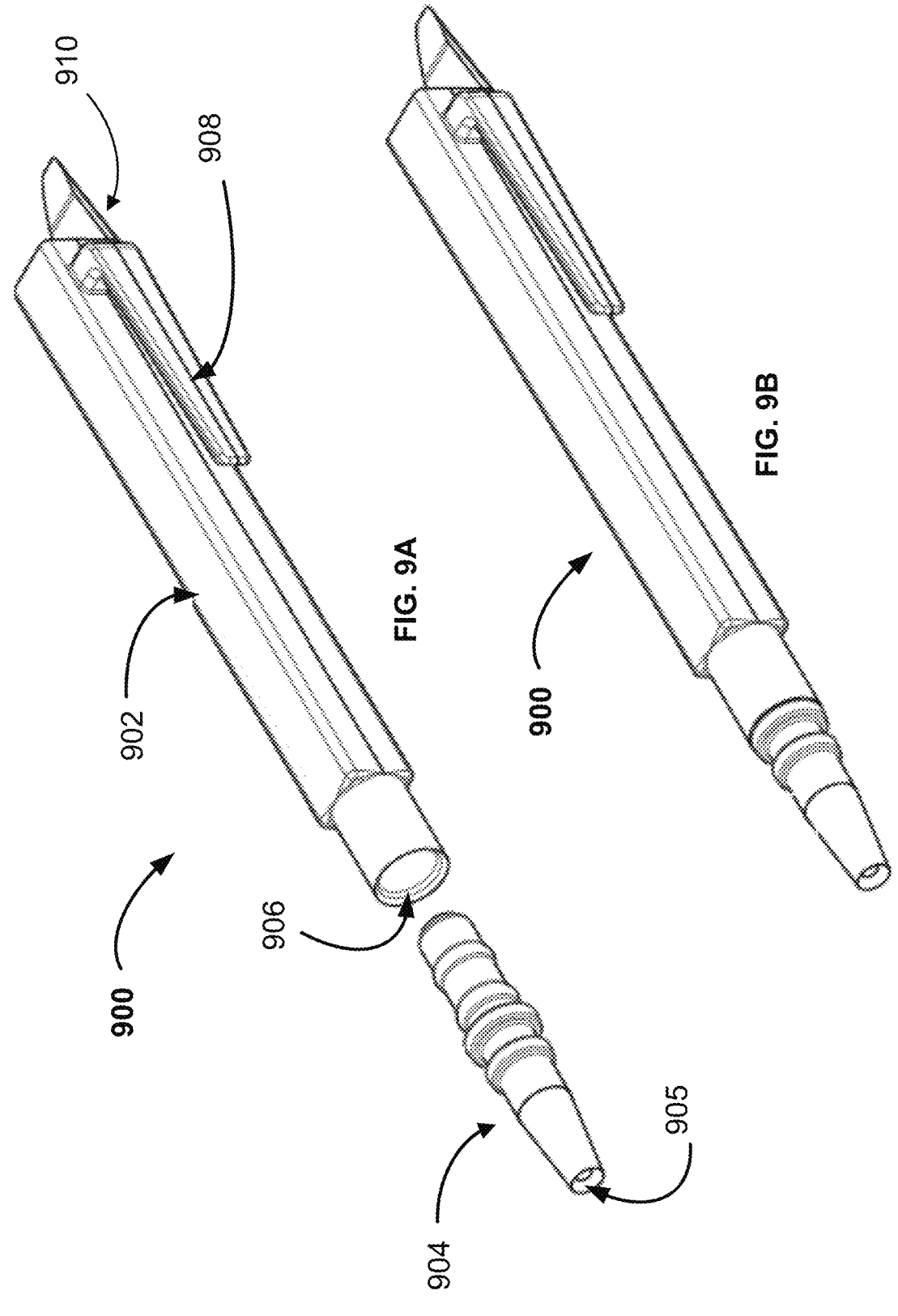
FIG. 9A illustrates a perspective exploded view of another optical fiber routing tool 900 that includes a removeable single fiber tip that can provide a reduced diameter bore therethrough that can be selectively removed for routing multiple optical fibers, or selectively installed for routing a single optical fiber, in accordance with certain exemplary implementations of the disclosed technology.
FIG. 9B illustrates an assembled perspective view of the optical fiber routing tool 900 as illustrated if FIG. 9A.

FIG. 9A illustrates a perspective exploded view of another optical fiber routing tool 900 that includes an elongated body 902. The elongated body 902 includes a body bore 906 therethrough having a first diameter and extending from a first end of the elongated body 902 to a second end of the elongated body 902. In certain implementations, the body bore 906 may be configured for placing one or more fibers therethrough. The optical fiber routing tool 900 may include a removable single fiber tip 904 that can be utilized for routing a single optical fiber, in accordance with certain exemplary implementations of the disclosed technology. In certain implementations, the removable tip 904 includes a tip bore 905 having a second diameter smaller than the first diameter of the body bore 906 and extending from a first end of the removable tip 904 to a second end of the removable tip 904. In certain implementations, the second end of the removable tip 904 is configured to removably couple with the body bore 906 at the first end of the elongated body 902, wherein the tip bore 905 of the removable tip 904 is configured for placing a fiber therethrough. Certain implementations of the disclosed technology include an attachment feature 908, such as a clip attached to the elongated body 908. Certain implementations of the disclosed technology include a pick feature 910 attached to the elongated body 908.

FIG. 9B illustrates an assembled perspective view of the optical fiber routing tool 900 as illustrated if FIG. 9A.

Figure 10:
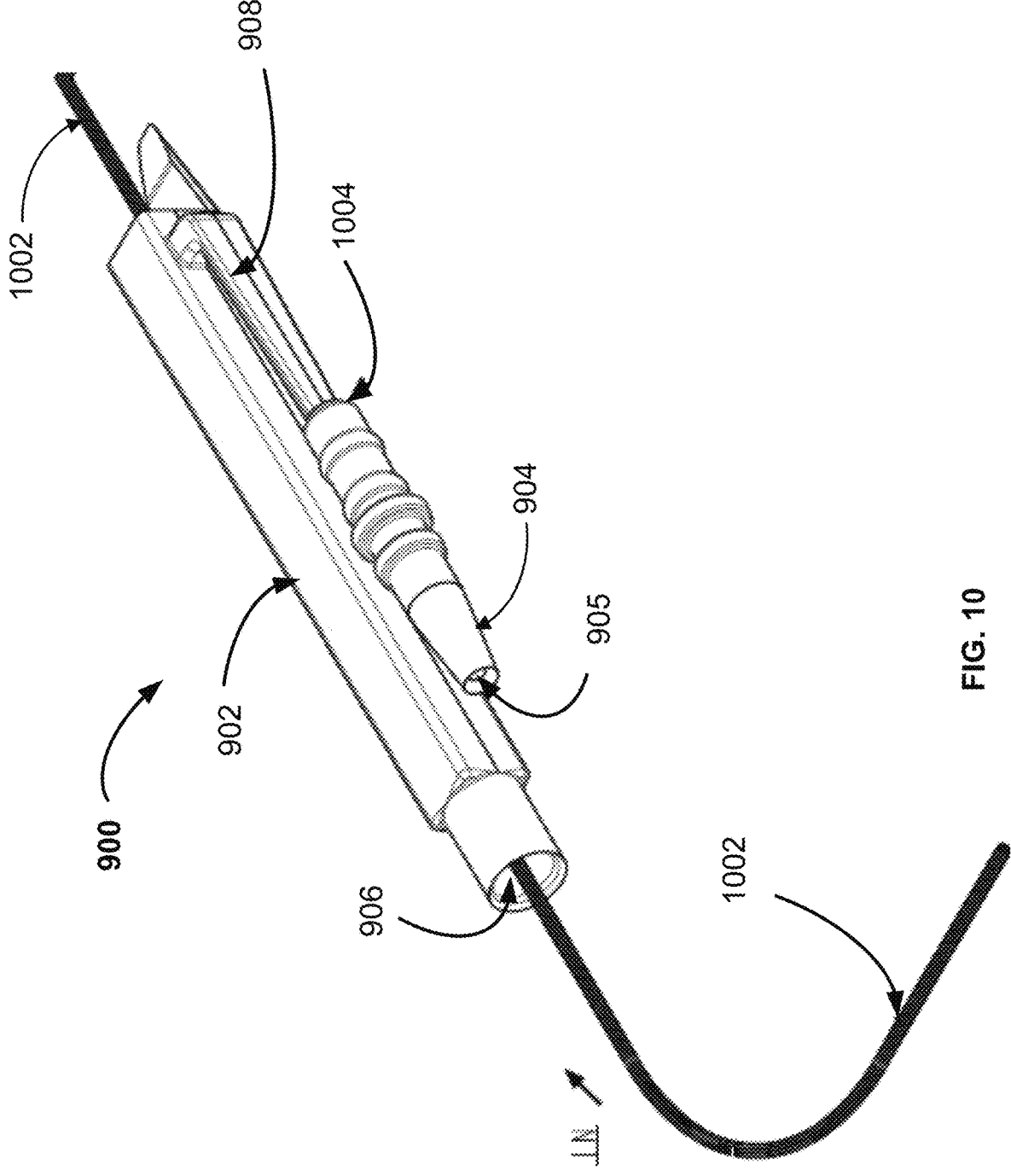
FIG. 10 illustrates a use of the optical fiber routing tool 900 (as illustrated in FIGS. 9A and 9B) with a multi-fiber bundle 1002 inserted through an internal bore in the elongated body, and with the single fiber tip removed from the end of the tool and stored on the attachment feature, in accordance with certain exemplary implementations of the disclosed technology.

FIG. 10 illustrates a use of the optical fiber routing tool 900 (as illustrated in FIGS. 9A and 9B) with a multi-fiber bundle 1002 inserted through an internal body bore 906 in the elongated body 902, and with the single fiber tip 904 removed from the end of the tool 900 and temporarily stored on the attachment feature 908, in accordance with certain exemplary implementations of the disclosed technology. For example, the attachment feature 908 (which may resemble a pocket clip of a writing implement) may be tapered and sized so that it may be inserted into the second end 1004 of the tip bore 905 such that the tapered end of the attachment feature 908 engages with the single fiber tip 904 within the tip bore 905 to form a friction fit between the attachment feature 908 and the single fiber tip 904. In this example implementation, the optical fiber routing tool 900 may be utilized and manipulated to route multiple fibers and/or a multi-fiber bundle 1002 within an enclosure.

In certain implementations, the diameter of the body bore 906 may be sized to allow a multiple optical fibers and/or a multiple-optical fiber bundle to be threaded therethrough. In certain implementations, the one or more sections of the optical fiber routing tool 900 may be elastically deformable (as illustrated in FIG. 5A) so that the elongated body 902 may be flexible to allow pinching to temporarily clamp down on the optical fiber bundle 1002 while manipulating the optical fiber bundle 1002 so that it does not slide within the body bore 906 of the optical fiber routing tool 900.

Figure 11:
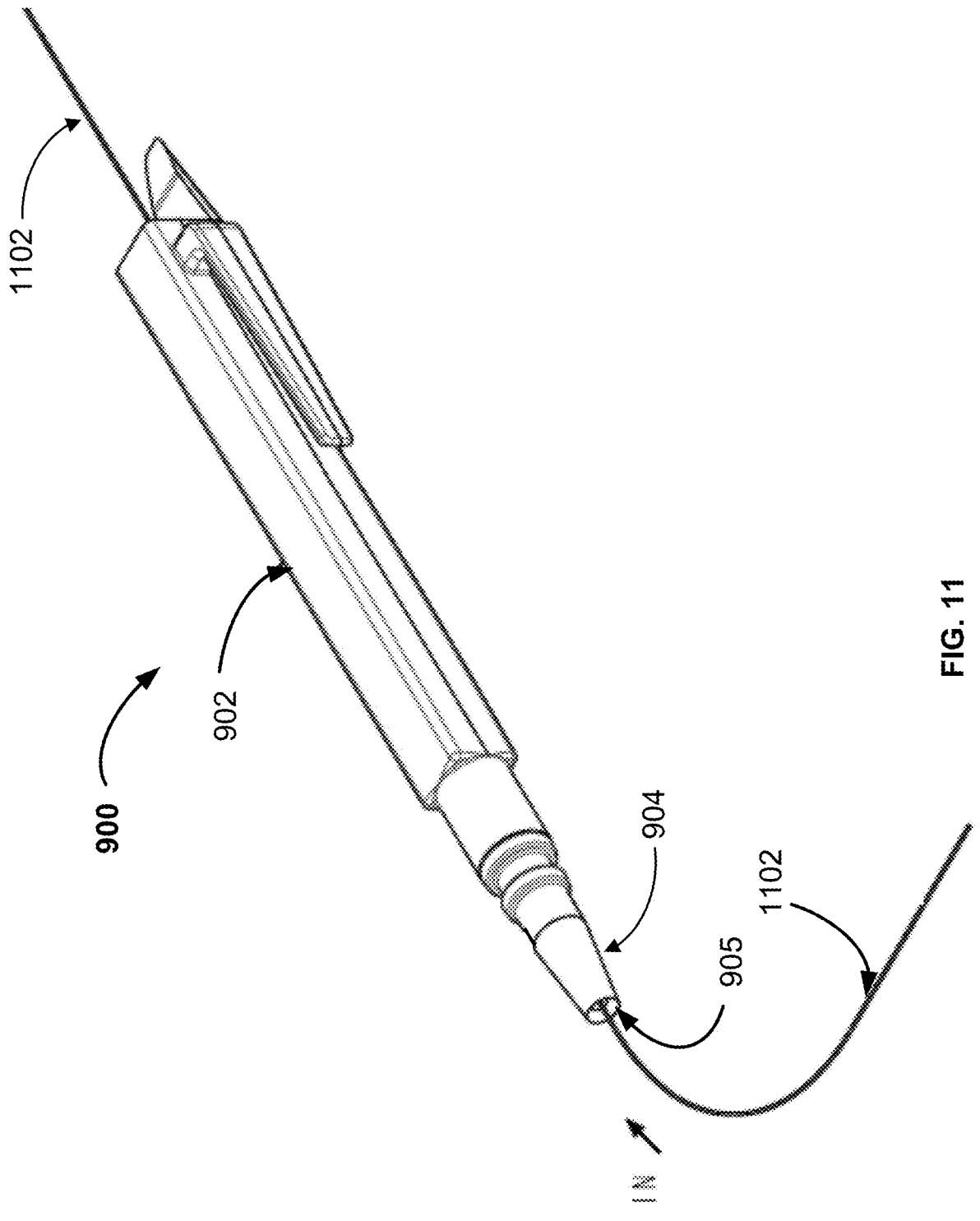
FIG. 11 illustrates a use of the optical fiber routing tool 900 (as illustrated in FIGS. 9A and 9B) with the single fiber tip attached to the end of the tool and with a single fiber 1102 inserted through an internal bore in the elongated body, in accordance with certain exemplary implementations of the disclosed technology.

FIG. 11 illustrates a use of the optical fiber routing tool 900 (as illustrated in FIGS. 9A and 9B) with the single fiber tip 904 attached to the end of the tool, and with a single fiber 1102 inserted through the tip bore 905 and threaded through the internal bore (i.e., the body bore 906 as shown in FIG. 9A) in the elongated body 902, in accordance with certain exemplary implementations of the disclosed technology.

In certain implementations, the diameter of the tip bore 905 may be sized to allow a single optical fiber to be threaded therethrough. In certain implementations, the one or more sections of the optical fiber routing tool 900 may be elastically deformable (as illustrated in FIG. 5A) so that one or more of the elongated body 902 and/or the single fiber tip 904 may be flexible to allow pinching to temporarily clamp down on the optical fiber 1102 while manipulating the optical fiber 1102 so that it does not slide within the internal bore of the optical fiber routing tool 900.

Figure 12:
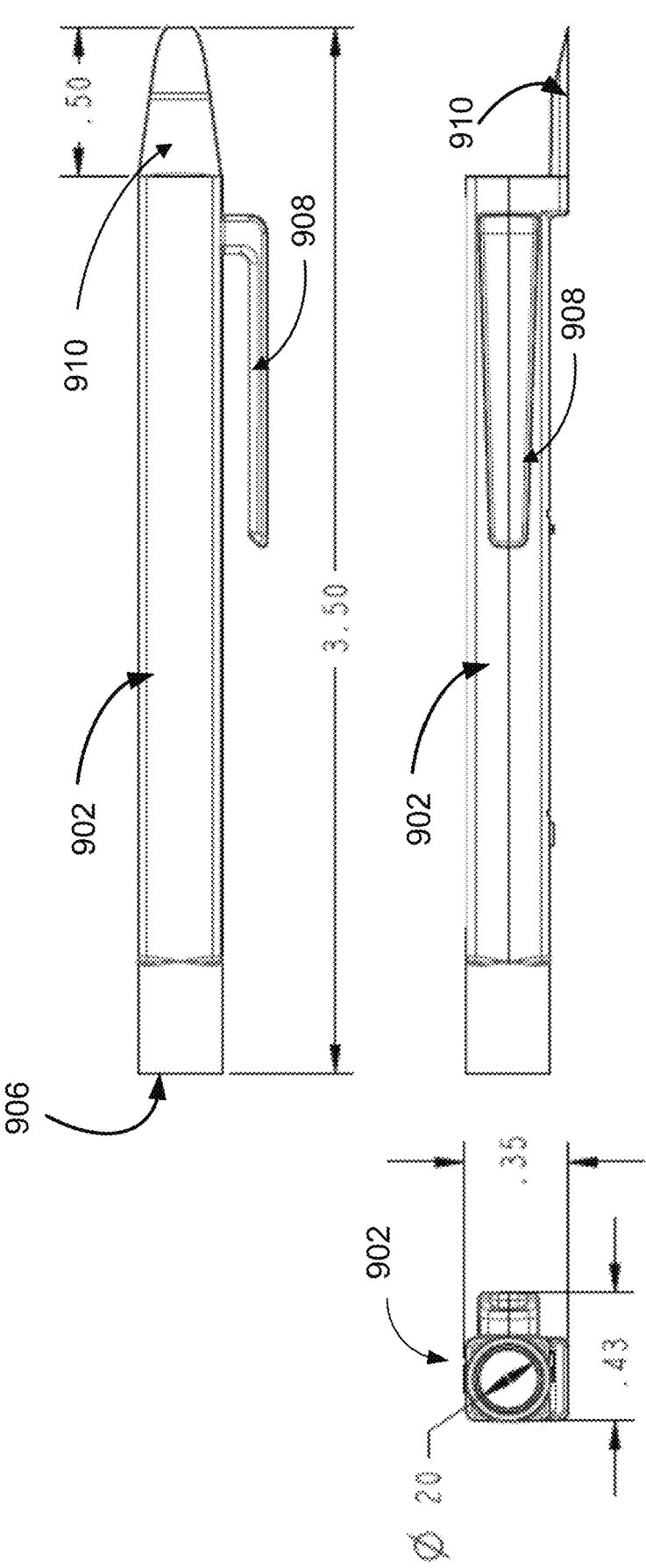
FIG. 12 illustrates a top cross-sectional side view (top figure), a side cross-sectional side view (bottom right figure) and a cross-sectional end view (bottom left figure) with example dimensions of the elongated body portion of the optical fiber routing tool, without the single fiber tip attached, in accordance with certain exemplary implementations of the disclosed technology.

FIG. 12 illustrates a top cross-sectional side view (top figure), a side cross-sectional side view (bottom right figure) and a cross-sectional end view (bottom left figure) with example dimensions of the elongated body 902 portion of the optical fiber routing tool (without the single fiber tip attached) in accordance with certain exemplary implementations of the disclosed technology. FIG. 12 illustrates example dimensions (in inches) for the elongated body 902 portion. However, other dimensions may be utilized without departing from the scope of the disclosed technology.

FIG. 13 illustrates a perspective view (top figure), a cross-sectional side view (bottom right figure) and a cross-sectional end view (bottom left figure) with example dimensions of the removable single fiber tip 904 attachment portion of the optical fiber routing tool (without the elongated body) in accordance with certain exemplary implementations of the disclosed technology. FIG. 13 illustrates example dimensions (in inches) for the removable tip 904 portion. However, other dimensions may be utilized without departing from the scope of the disclosed technology.

FIG. 14 is a flow diagram of a method 1400 for routing a plurality of optical fibers in an enclosure using an optical fiber routing tool, accordance with certain exemplary implementations of the disclosed technology. In block 1402, the method 1400 includes temporarily securing the plurality of optical fibers in the optical fiber routing tool, wherein the optical fiber routing tool comprises an elongated body comprising a body bore having a first diameter and extending from a first end of the elongated body to a second end of the elongated body, the body bore configured for placing one or more optical fibers therethrough, and a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing an optical fiber therethrough. In block 1404, the method 1400 includes removing the removable tip from the body bore of the optical fiber routing tool. In block 1406, the method 1400 includes threading the plurality of optical fibers through the body bore. In block 1408, the method 1400 includes manipulating the optical fiber routing tool.

In certain implementations, the optical fiber routing tool can include an attachment feature configured to couple with at least a portion of the tip bore of the removable tip when the removable tip is detached from the elongated body. In certain implementations, the removable tip may be configured for being secured to the attachment feature when the removable tip is removed from the body bore of the optical fiber routing tool. In certain implementations, a first diameter of the body bore is in the range of 0.15 to 0.25 inches.

Certain implementations of the disclosed technology can include removing the plurality of optical fibers from the optical fiber routing tool upon completion of the manipulating.

FIG. 15 is a flow diagram of a method 1500 for routing an optical fiber in an enclosure using an optical fiber routing tool, in accordance with certain exemplary implementations of the disclosed technology. In block 1502, the method 1500 includes temporarily securing the optical fiber in the optical fiber routing tool, wherein the optical fiber routing tool comprises an elongated body comprising a body bore having a first diameter and extending from a first end of the elongated body to a second end of the elongated body, the body bore configured for placing one or more fibers therethrough, and a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing a fiber therethrough. In block 1504, the method 1500 includes inserting the second end of the removable tip into the body bore of the elongated body at the first end. In block 1506, the method 1500 includes threading the optical fiber through the combined tip bore of the removable tip and the body bore of the elongated body. In block 1508, the method 1500 includes manipulating the optical fiber routing tool.

In certain implementations, the removable tip can include an elastically deformable portion, and temporarily securing the optical fiber in the optical fiber routing tool can include pinching the elastically deformable portion to retain the optical fiber.

Certain implementations of the disclosed technology can include removing the optical fiber from the optical fiber routing tool upon completion of the manipulating.

In accordance with certain exemplary implementations of the disclosed technology, and in a coupled configuration in which the removable tip is coupled with the elongated body, the optical fiber routing tool may be configured for placing a single optical fiber through the tip bore and the body bore. In a decoupled configuration in which the removable tip is decoupled from the elongated body, the optical fiber routing tool may be configured for placing a plurality of optical fibers through the body bore for routing.

In certain implementations, the optical fiber routing tool can include an attachment feature connected to the elongated body and configured to engage with and store the decoupled removable tip when not in use. In certain implementations, the attachment feature can include a tapered member configured to couple with at least a portion of the tip bore of the removable tip.

In accordance with certain exemplary implementations of the disclosed technology, the elongated body of the optical fiber routing tool may be essentially cylindrical in shape.

In certain implementations, the removable tip can include a tapered portion disposed at the first end of the removable tip.

In certain implementations, the removable tip can include a stop feature positioned between the first end and second end of the removable tip and configured to limit a length of insertion of the removable tip within the body bore.

In certain implementations, the removable tip can include one or more gasket features disposed between the stop feature and the second end of the removable tip. The one or more gasket features may be configured to removably secure the removable tip within the body bore of the elongated body.

Certain implementations of the disclosed technology can include a pick feature disposed at the second end of the elongated body and configured to facilitate manipulation of optical components or fibers.

In certain implementations, the removable tip can include a elastically deformable portion configured to pinch and retain the optical fiber.

In certain implementations, wherein the first diameter of the body bore may be configured in the range of 0.15 to 0.25 inches.

In certain implementations, the second diameter of the tip bore may be configured in the range of 0.04 to 0.08 inches.

In the foregoing description, references to "an embodiment" or "certain embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims herein. Accordingly, the disclosure of various embodiments is intended to be illustrative, but not limiting, of the scope of the technology as set forth in the following claims.

What is claimed:

1. An optical fiber routing tool, comprising:

an elongated body comprising a body bore having a first diameter and extending from a first end of the elongated body to a second end of the elongated body, the body bore configured for placing one or more optical fibers therethrough for routing;

a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing an optical fiber therethrough for routing; and an attachment feature connected to the elongated body, the attachment feature configured to engage with and store the removable tip outside of the elongated body when decoupled and not in use.

2. The optical fiber routing tool of claim 1, wherein in a coupled configuration in which the removable tip is coupled with the elongated body, the optical fiber routing tool is configured for placing a single optical fiber through the tip bore and the body bore.

3. The optical fiber routing tool of claim 1, wherein in a decoupled configuration in which the removable tip is decoupled from the elongated body, the optical fiber routing tool is configured for placing a plurality of optical fibers through the body bore for routing.

4. The optical fiber routing tool of claim 1, wherein the attachment feature comprises a tapered member configured to couple with at least a portion of the tip bore of the removable tip.

5. The optical fiber routing tool of claim 1, wherein the elongated body is essentially cylindrical in shape.

6. The optical fiber routing tool of claim 1, wherein the removable tip comprises a tapered portion disposed at the first end of the removable tip.

7. The optical fiber routing tool of claim 1, wherein the removable tip comprises a stop feature positioned between the first end and second end of the removable tip, the stop feature configured to limit a length of insertion of the removable tip within the body bore.

8. The optical fiber routing tool of claim 7, wherein the removable tip comprises one or more gasket features disposed between the stop feature and the second end of the removable tip, the one or more gasket features configured to removably secure the removable tip within the body bore of the elongated body.

9. The optical fiber routing tool of claim 1, further comprising a pick feature disposed at the second end and configured to facilitate manipulation of optical components or fibers.

10. The optical fiber routing tool of claim 1, wherein the removable tip comprises an elastically deformable portion configured to pinch and retain the optical fiber.

11. The optical fiber routing tool of claim 1, wherein the first diameter of the body bore is in the range of 0.15 to 0.25 inches.

12. The optical fiber routing tool of claim 1, wherein the second diameter of the tip bore is in the range of 0.04 to 0.08 inches.

13. A method of routing a plurality of optical fibers in an enclosure using an optical fiber routing tool, the method comprising:

temporarily securing the plurality of optical fibers in the optical fiber routing tool, wherein the optical fiber routing tool comprises:

an elongated body comprising a body bore having a first diameter and extending from a first end of the elongated body to a second end of the elongated body, the body bore configured for placing one or more optical fibers therethrough;

a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing an optical fiber therethrough; and an attachment feature configured to couple with at least a portion of the tip bore of the removable tip when the removable tip is detached from the elongated body, and wherein the removable tip is configured for being secured to the attachment feature outside of the elongated body when the removable tip is removed from the body bore of the optical fiber routing tool;

wherein temporarily securing the plurality of fibers in the optical fiber routing tool comprises:

removing the removable tip from the body bore of the optical fiber routing tool;

threading the plurality of optical fibers through the body bore; and manipulating the optical fiber routing tool.

14. The method of claim 13, wherein the first diameter of the body bore is in the range of 0.15 to 0.25 inches.

15. The method of claim 13, further comprising removing the plurality of optical fibers from the optical fiber routing tool upon completion of the manipulating.

16. A method of routing an optical fiber in an enclosure using an optical fiber routing tool, the method comprising:

temporarily securing the optical fiber in the optical fiber routing tool, wherein the optical fiber routing tool comprises:

an elongated body comprising a body bore having a first diameter and extending from a first end of the elongated body to a second end of the elongated body, the body bore configured for placing one or more fibers therethrough;

a removable tip comprising a tip bore having a second diameter smaller than the first diameter of the body bore and extending from a first end of the removable tip to a second end of the removable tip, wherein the second end of the removable tip is configured to removably couple with the body bore at the first end of the elongated body, wherein the tip bore of the removable tip is configured for placing a fiber therethrough; and an attachment feature configured to couple with at least a portion of the tip bore of the removable tip when the removable tip is detached from the elongated body, and wherein the removable tip is configured for being secured to the attachment feature outside of the elongated body when the removable tip is removed from the body bore of the optical fiber routing tool;

wherein temporarily securing the optical fiber in the optical fiber routing tool comprises:

inserting the second end of the removable tip into the body bore of the elongated body at the first end; and threading the optical fiber through the combined tip bore of the removable tip and the body bore of the elongated body; and manipulating the optical fiber routing tool.

17. The method of claim 16, wherein the removable tip comprises an elastically deformable portion, and wherein temporarily securing the optical fiber in the optical fiber routing tool comprises pinching the elastically deformable portion to retain the optical fiber.

18. The method of claim 16, further comprising removing the optical fiber from the optical fiber routing tool upon completion of the manipulating.

* * * * *